(12) United States Patent
Knickerbocker et al.

(10) Patent No.: US 9,272,620 B2
(45) Date of Patent: Mar. 1, 2016

(54) TRUE FOUR WHEEL DRIVE SYSTEM FOR VEHICLE

(71) Applicant: The Hilliard Corporation, Elmira, NY (US)

(72) Inventors: Howard J. Knickerbocker, Elmira, NY (US); David Ochab, Horseheads, NY (US); J. Brendan Brewer, Elmira, NY (US); James E. Palmer, Elmira Heights, NY (US)

(73) Assignee: The Hilliard Corporation, Elmira, NY (US)

( * ) Notice: Subject to any disclaimer, the term of this patent is extended or adjusted under 35 U.S.C. 154(b) by 302 days.

(21) Appl. No.: 13/955,248

(22) Filed: Jul. 31, 2013

(65) Prior Publication Data

US 2014/0038763 A1    Feb. 6, 2014

Related U.S. Application Data

(60) Provisional application No. 61/677,820, filed on Jul. 31, 2012.

(51) Int. Cl.
| | | |
|---|---|---|
| *B60K 23/08* | (2006.01) | |
| *B60K 17/02* | (2006.01) | |
| *B60K 17/26* | (2006.01) | |
| *B60K 17/344* | (2006.01) | |
| *F16H 48/16* | (2006.01) | |

(52) U.S. Cl.
CPC .............. *B60K 23/08* (2013.01); *B60K 17/02* (2013.01); *B60K 17/26* (2013.01); *B60K 17/344* (2013.01); *F16H 48/16* (2013.01)

(58) Field of Classification Search
CPC ................................ B60K 23/08; F16H 48/16
See application file for complete search history.

(56) References Cited

U.S. PATENT DOCUMENTS

| | | | |
|---|---|---|---|
| 3,124,972 | A |  3/1964 | Seliger et al. |
| 3,173,309 | A |  3/1965 | Seliger |
| 3,447,396 | A |  6/1969 | Seliger |
| 3,581,597 | A |  6/1971 | Reiersgaard |
| 3,700,082 | A | 10/1972 | Schwab |
| 3,935,753 | A |  2/1976 | Williams |
| 4,989,686 | A |  2/1991 | Miller et al. |
| 5,704,866 | A * |  1/1998 | Pritchard et al. ............. 475/206 |
| 6,176,359 | B1 |  1/2001 | Krisher |
| 6,409,000 | B1 |  6/2002 | Itoh et al. |
| RE38,012 | E |  3/2003 | Ochab et al. |
| 6,530,447 | B2 |  3/2003 | Seki et al. |

(Continued)

OTHER PUBLICATIONS

International Search Report and Written Opinion, PCT/US2014/048660, Nov. 14, 2014, 11 pages.

*Primary Examiner* — Terence Boes

(74) *Attorney, Agent, or Firm* — Drinker Biddle & Reath LLP

(57) ABSTRACT

A drive train for a four wheel drive vehicle including a front differential engaged with a front drive shaft and front axles through a front differential gear set. The front differential includes a front bi-directional overrunning clutch that controls transmission of torque transfer between the front drive shaft and the front axles. A rear differential is engaged with rear axles and the transmission through a rear differential gear set. The rear differential includes a rear bi-directional overrunning clutch that controls torque transfer between the transmission and the rear axles. The differentials are configured with a gear ratio that is within five percent of a 1:1 gear ratio.

15 Claims, 8 Drawing Sheets

(56) References Cited

U.S. PATENT DOCUMENTS

| | | |
|---|---|---|
| 6,622,833 B2 | 9/2003 | Baumann et al. |
| 6,622,837 B2 | 9/2003 | Ochab et al. |
| 6,629,590 B2 | 10/2003 | Ochab et al. |
| 6,722,482 B2 | 4/2004 | Takuno et al. |
| 6,722,484 B2 | 4/2004 | Ochab et al. |
| 6,834,750 B2 | 12/2004 | Baker et al. |
| 7,032,732 B2 | 4/2006 | Muramatsu et al. |
| 7,410,042 B2 | 8/2008 | Ochab et al. |
| 7,938,041 B1 | 5/2011 | Shiigi et al. |
| 2004/0182670 A1 | 9/2004 | Nojiri et al. |
| 2005/0077137 A1 | 4/2005 | Nozaki et al. |
| 2007/0170029 A1 | 7/2007 | Okada et al. |
| 2012/0152686 A1 | 6/2012 | Brewer et al. |
| 2013/0112520 A1 | 5/2013 | Heath et al. |
| 2013/0134006 A1 | 5/2013 | Heath et al. |

\* cited by examiner

TRUE FOUR WHEEL DRIVE SYSTEM FOR VEHICLE

RELATED APPLICATION

This application is related to and claims priority from U.S. Provisional Application 61/677,820, the disclosure of which is incorporated herein by reference in its entirety.

FIELD OF THE INVENTION

The invention relates to drive systems and, more particularly, to an improved drive system designed to provide substantially true four wheel drive capability.

BACKGROUND

There are many systems on the market that try to provide four wheel drive capability. Those systems are all designed to engage all four wheels but also allow a speed differential across the axle. However, many of those systems do not provide true four wheel drive where each wheel provides substantially the same speed during all drive conditions. Instead, the systems permit some degree of slippage.

Current Four Wheel Drive Bi-Directional Overrunning Clutch Systems

FIG. 1 illustrates the drive system for a conventional four wheel drive vehicle with a front bi-directional over-running clutch. The drive system includes four wheels. The rear left wheel RLW is connected to a rear differential RD through a rear left axle RLA. The right rear wheel RRW is connected to the rear differential RD through a rear right axle RRA. The front left wheel FLW is connected to a front differential FD through a front left axle FLA. The front right wheel FRW is connected to the front differential FD through a front right axle FRA.

The rear differential RD is connected to the transmission T through a rear drive shaft RDS. The front differential FD is connected to the transmission T through a front drive shaft FDS.

Straight Line Operation:

During straight line driving while the vehicle is in a four wheel on demand mode (i.e., four wheel drive engages only when needed) both rear wheels RLW, RRW are the primary drive wheels and are connected through the rear differential RD to rotate at the same speed. In a non-slip condition of the rear wheels, the front drive shaft FDS is engaged to the front differential FD, but the front axles FLA, FRA are not engaged with the front differential. That is, the front axles FLA, FRA and front wheels FLW, FRW are generally in an overrun condition such that the front differential FD is not driving the front axles FLA, FRA and, therefore, not transmitting any torque to the front wheels. This means that the front wheels FLW, FRW are free to rotate at their actual ground speeds.

In order for the front wheels to be engaged, the rear wheels must slip (break traction) or spin increase speed approximately 20% faster than the front wheels. While driving in a straight line, once the rear wheels slip 20%, the overrunning condition in the front differential ED is overcome and both front axles are engaged. This results in the transmission T transmitting torque to the front wheels thru the front drive which is geared in a way that decreases the vehicles ground speed. When the ground speed has increased so as to cause the rear wheel speed to be rotating less than 20% faster than the ground speed, or the speed of the rear wheels has decreased so as to be rotating less than 20% faster than the ground speed, the front wheels will start to overrun again and no torque will be transmitted to the front wheels.

Turning Operation:

In a corner all four wheels are trying to rotate at different speeds. This is shown on the chart in FIG. 4 which depicts wheel revolutions vs. turning radius for all four wheels. For a vehicle with a locked rear axle or solid axle (i.e., an axle where the rear axles RLA, RRA are connected, either physically or through gearing, such that they always rotate at the same speed) the ground speed is dictated by the rear outside wheel due to vehicle dynamics (i.e., the rear outside wheel has to cover more circumferential distance than the rear inside wheel when turning around a common axis.) Since both rear wheels are rotating at the same speed and the rear outside wheel is the drive wheel the rear inside wheel is beginning to scrub or drag on the ground. This can cause inefficiencies, turf wear and/or tire wear.

The primary reason conventional bi-directional overrunning clutch four wheel drive systems have a 20% under drive is for turning. With the rear outside wheel dictating ground speed the front inside wheel will go slower than the rear outside wheel as shown in FIG. 4. If there is no under drive the bi-directional overrunning clutch for the front inside axle would engage and begin to drive torque. This would cause the front inside wheel to travel at an incorrect speed and would create inefficiencies, turf wear, tire wear and, more importantly, torque steer.

As mentioned above, during a turn the rear outside wheel is dictating ground speed, the rear inside wheel is scrubbing or dragging, and the front wheels are overrunning. Referring to FIG. 5 which depicts the percentage difference between the front and rear wheel speeds versus the turning radius of a locked rear axle, once the rear outside wheel slips or spins a certain percentage, dictated by vehicle geometry and turning radius, the bi-directional overrunning clutch controlling the transfer of torque to the front inside wheel will engage and drive torque through the front inside wheel. At this time both rear wheels and the front inside wheel are driving torque and their speed is dictated by the drive line, not ground speed. The front outside wheel is still overrunning allowing it to spin at the rotational speed dictated by ground speed and vehicle geometry. When both rear wheels and the front inside wheel slip a certain percentage, again dictated by vehicle geometry and the turning radius, the bidirectional clutch controlling torque transfer to the front outside wheel will engage and torque will be transmitted to all four wheels, even though three of the wheels would be slipping.

Wedging

The existing drive system is prone to a condition called wedging. Wedging occurs when torque is being driven through the bidirectional over-running clutch and a rapid direction change occurs. This can cause the rollers in the clutch to be positioned or locked on the wrong side of the clutch profile preventing the output hubs from overrunning. The effect causes the front drive to act like a solid axle, but with the 20% speed difference in the drive line it results in scrubbing of the front tires. This condition can cause excessive tire wear and turf wear. This also effects steering effort and stability of the vehicle. The vehicle will try to maintain a straight line due to the effect of the front drive acting like a solid axle.

Because of the wedging condition in the current systems precautions are put into place to help reduce wedging. One of these precautions is the use of a cut-off switch so that when the vehicle is shifted from the forward direction to the reverse direction so as to automatically disengage the bi-directional overrunning clutch (for example, shutting off the coil that is indexing the roll cage). This system also uses the cut-off switch when transitioning from the reverse direction to the forward direction. Another way to reduce wedging is the use of a switch, when the brakes are applied, that will interrupt power to the 4 wheel drive system. Many other methods can be used to reduce wedging, but none are 100% percent effective with the 20% difference in drive line speeds.

Conventional Drive Systems:

A common conventional drive system would have the same vehicle layout as in FIG. 1, but the mechanisms in the front and rear differentials would be different. Most common drive systems have an open differential with the ability to be locked into a solid axle in both the front and rear differentials. The drive line in a conventional system would also be using a drive line that is geared to a 1:1 ratio.

Straight Line Operation:

During straight line driving while the vehicle is in four wheel drive and all the axles are unlocked, all four wheels are rotating at the same speed. This is due to the drive line being geared at 1:1 ratio and the front and rear differentials are being driven at the same speed and no differentiation is needed across the axles. This is also the case when any or both of the front and rear differentials are in a locked position creating a solid axle.

Turning Operation:

Conventional four wheel drive systems will normally have the rear differential locked and the front drive will be in the open state until the solid axle mode is selected by the user. During turning with a solid axle in the rear differential and an open differential in the front, only one tire is turning at the correct ground speed. Due to vehicle dynamics the rear outside wheel is considered the drive wheel and is turning at ground speed. The inside rear wheel is being driven at the same speed as the rear outside, but the ground speed is slower. This causes the inside rear wheel to scrub or slip during a turn.

Since the two front wheels are connected to an open differential, they are allowed to differentiate across the axle. However, the differential is being driven at an incorrect speed. That is, the front open differential takes the input speed and averages it across the axle. In a normal non slip condition the average speed across the axle is centered about the middle of the vehicle. Since the rear outside wheel is traveling at a different speed (or arc) than the average of the two front wheels, both front wheels are scrubbing when in a turn causing un-needed drive line torque or drive line bind.

Once the operator selects the solid axle mode of the vehicle, both front wheels are locked together and they now rotate at the same speed. When turning, the outside front wheel is going slower than what ground speed dictates, thus causing the wheel to scrub. At the same time the inside front wheel is going faster than the ground speed dictates causing it to, likewise, scrub.

Due to the wheels being driven at the wrong speeds in a corner, conventional drive systems are not very efficient. They cause severe turf damage or wear due to the tires scrubbing. They also cause tire wear due to the scrubbing. The tires being driven at the wrong speeds also cause issues with steering and turning performance of the vehicle. The difference between ground and actual wheel speed results in the wheels trying to straighten the vehicle out. This cause's increased wear in steering components, as well as rider fatigue since increased input is needed to maintain the vehicle in the turn. Many manufacturers have added power steering to try to minimize operator input when cornering because of the four wheel drive operations.

A need therefore exists for an improved four wheel drive system that incorporates bi-directional overrunning clutches in a drive system that minimizes scrubbing in all wheels while permitting 1.1 or near 1:1 gear ratio between the front and rear axles.

SUMMARY OF THE INVENTION

The present invention is directed to drive train for a four wheel drive vehicle. The drive train includes a front drive shaft connected to a transmission. Two front axles with each axle connected to a corresponding front wheel. A front differential is engaged with the front drive shaft and the front axles through a front differential gear set. The front differential includes a front bi-directional overrunning clutch that controls transmission of torque transfer between the front drive shaft and the front axles.

The front bi-directional overrunning clutch includes a front clutch housing connected to the front drive shaft so as to be rotatable by the front drive shaft, the front clutch housing including an inner cam surface. A front roller assembly is located inside the front clutch housing and adjacent to the cam surface. The front roller assembly includes a roll cage with a plurality of rollers arranged in two sets within slots formed in the roll cage, the rollers are rotatable inside the slots. A plurality of springs are arranged in the roll cage to position the rollers within the slots. The roll cage is rotatable within the front clutch housing.

Two front hub are located in the front clutch housing. Each hub is positioned radially inward from a set of the rollers located between an outer surface of the front hub and the inner cam surface. Each front hub is engaged with an axial end of one of the front axles so as to rotate in combination with the axle. The front hubs are independently rotatable within the roll cage and the front clutch housing.

A front engagement control assembly is located within the housing and controls engagement and disengagement of the front bi-directional overrunning clutch. The front engagement control assembly includes an electromechanical device that is controllable for impeding rotation of the roll cage relative to the front clutch housing so as to index the roll cage relative to the front clutch housing.

When the engagement control assembly is activated and the roll cage is indexed relative to the clutch housing, the front bi-directional overrunning clutch is configured to transmit torque from the front drive shaft to the front axles when the front clutch housing is rotating faster than the front axles. Also, when the vehicle is traveling straight the front differential is configured to begin to transmit torque from the front drive shaft to the front axles at a first speed.

The gear train including two rear axles, each axle connected to a corresponding rear wheel. A rear differential is engaged with the rear axles and the transmission through a rear differential gear set. The rear differential including a rear differential housing and a rear bi-directional overrunning clutch that controls torque transfer between the transmission and the rear axles.

The rear bi-directional overrunning clutch includes a rear clutch housing located within the rear differential housing and rotatable by the transmission, the rear clutch housing including an inner cam surface. A rear roller assembly is located inside the rear clutch housing and adjacent to the cam surface. The rear roller assembly includes a roll cage with a plurality of rollers arranged in two sets within slots formed in the roll cage. The rollers are rotatable inside the slots. A plurality of springs are arranged so as to position the rollers within the slots. The roll cage is rotatable within the rear clutch housing.

Two rear hubs are located in the rear clutch housing. Each hub is positioned radially inward from a set of the rollers located between an outer surface of the rear hub and the inner cam surface. Each rear hub is engaged with an axial end of one of the rear axles so as to rotate in combination with the axle. The rear hubs are independently rotatable within the roll cage and the rear clutch housing.

The rollers in each set of the rear roller assembly are adapted to wedgingly engage the corresponding rear hub to the rear clutch housing when one of either the rear hub or rear clutch housing is rotating faster than the other so as to transmit torque from whichever is faster to whichever is slower.

The differentials are configured such that when the vehicle is traveling straight and the rear differential is transmitting torque to the rear axles. The rear differential is configured to rotate the rear axles at a second speed, and where the difference between the first speed and the second speed is five percent or less. In one preferred embodiment, the difference between the first speed and the second speed is less than about three percent. In another embodiment there is substantially no difference between the first speed and the second speed.

In one embodiment, the front bi-directional overrunning clutch includes an armature plate that is engaged or connected with the front roll cage such that the armature plate rotates with the roll cage. The front engagement control assembly impedes rotation of the roll cage relative to the front clutch housing by engaging the armature plate so as to index the roll cage relative to the clutch housing.

Preferably the hubs are substantially coaxially aligned with each other within the housing, and are adapted to rotate about a common axis within the housing.

In one embodiment, the rear differential is part of a transaxle which is engaged with the transmission.

In another embodiment the front differential is part of a transaxle which is engaged with the transmission.

The foregoing and other features of the invention and advantages of the present invention will become more apparent in light of the following detailed description of the preferred embodiments, as illustrated in the accompanying figures. As will be realized, the invention is capable of modifications in various respects, all without departing from the invention. Accordingly, the drawings and the description are to be regarded as illustrative in nature, and not as restrictive.

BRIEF DESCRIPTION OF THE DRAWINGS

For the purpose of the illustrating the invention, the drawings show a form of the invention which is presently preferred. However, it should be understood that this invention is not limited to the precise arrangements and instrumentalities shown in the drawings.

DESCRIPTION OF THE PREFERRED EMBODIMENTS

Figure 1:
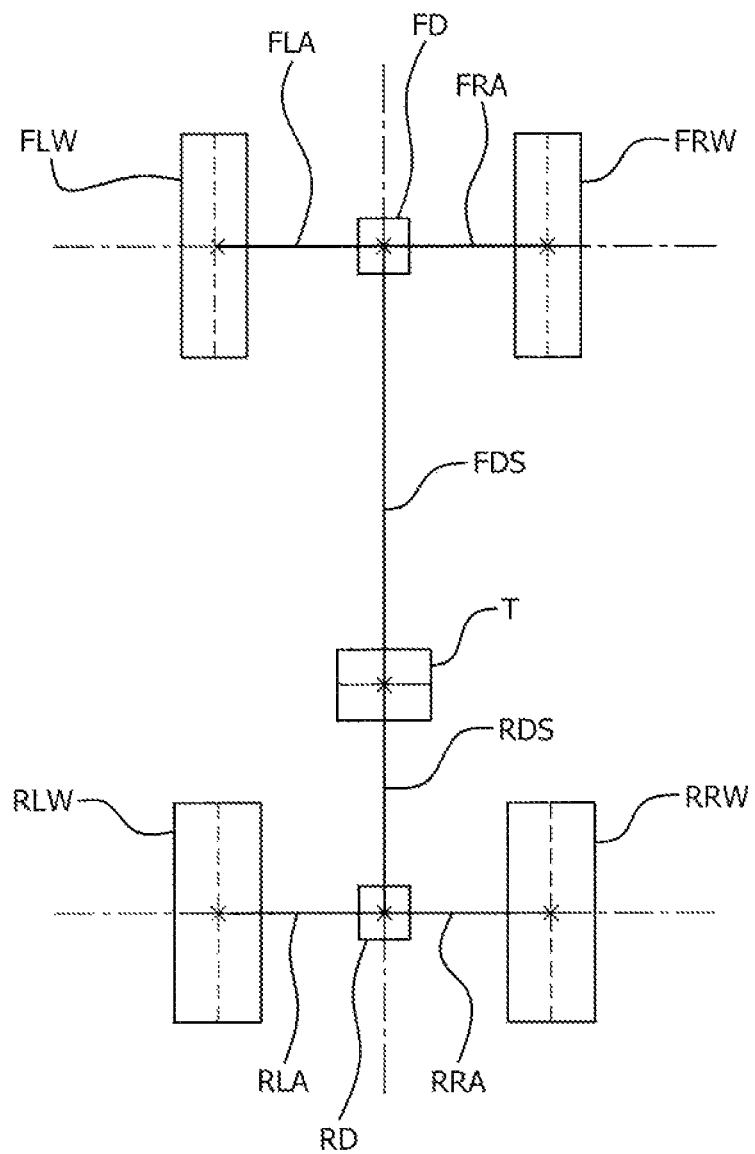
FIG. 1 is a schematic representation of a conventional four wheel drive system with a bidirectional overrunning clutch.
Figure 2:
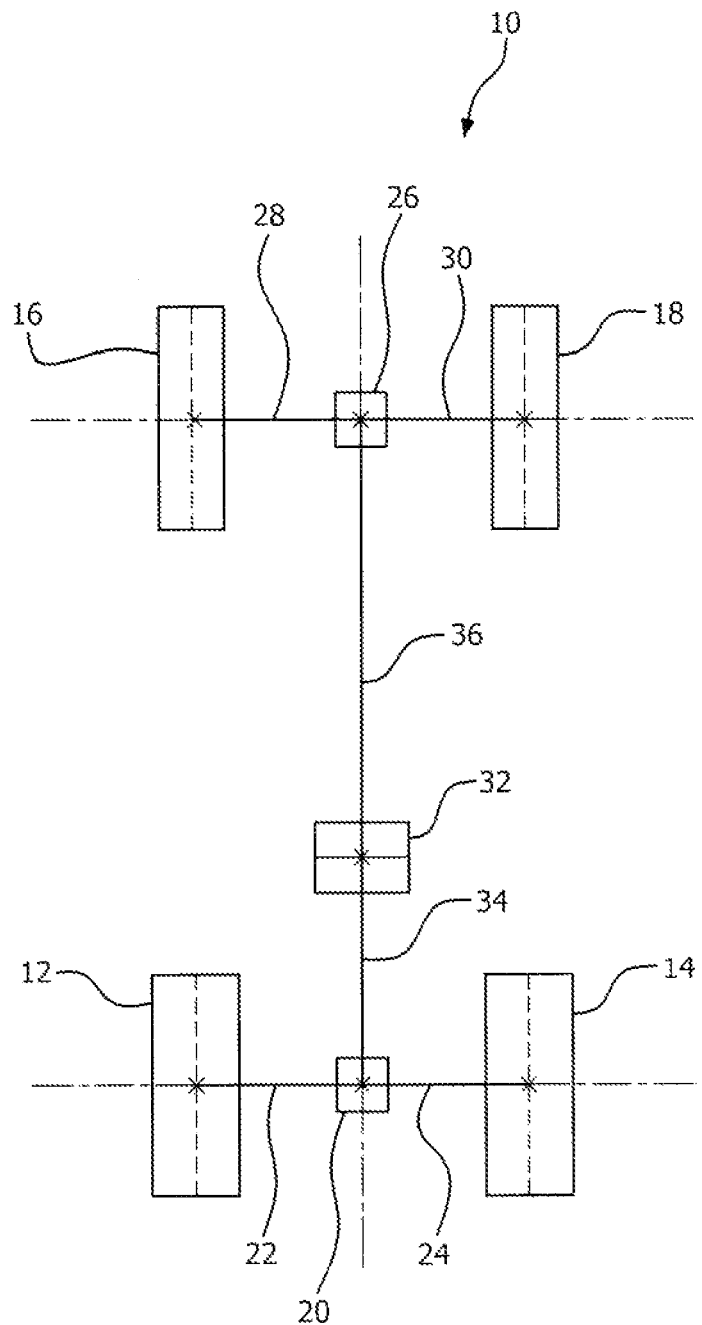
FIG. 2 is a schematic representation of a four wheel drive system according to the present invention.

Referring now to the drawings, a preferred embodiment, a drive system 10 for a four wheel drive vehicle according to the present invention is shown in FIG. 2. The drive system includes four wheels 12, 14, 16, 18. The left rear wheel 12 is connected to a rear differential 20 through a first rear axle 22. The right rear wheel 14 is connected to the rear differential 20 through a second rear axle 24. The left front wheel 16 is connected to a front differential 2 through a front axle 28. The right front wheel 18 is connected to the front differential 26 through a second front axle 30.

The rear differential 20 is connected to the transmission 32 through a rear drive shaft 34. The front differential 26 is connected to the transmission 32 through a front drive shaft 36. Either of these connections could be made in one housing such as a transaxle.

Figure 7:
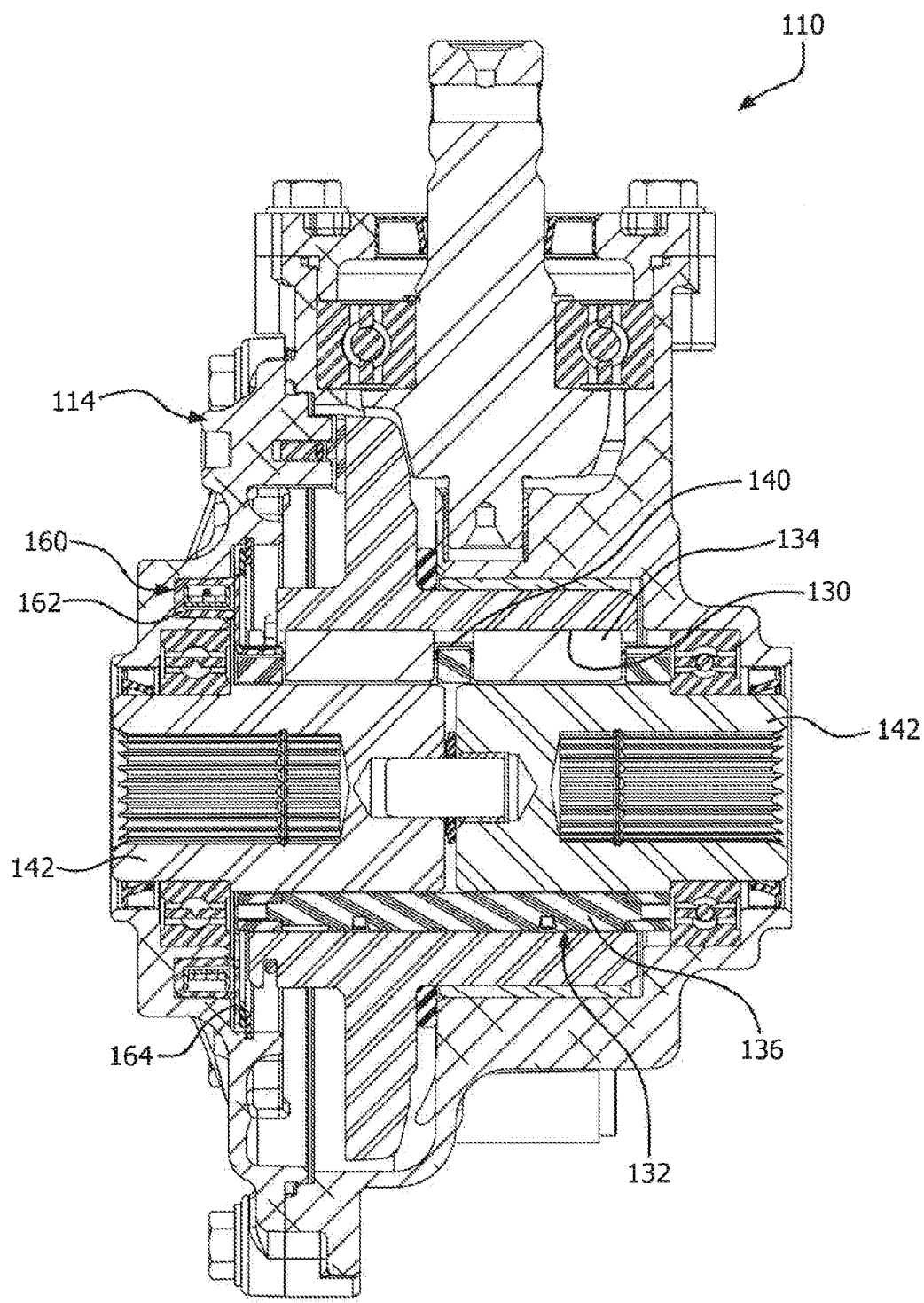
FIG. 7 is a cross section through an embodiment of a front differential.
Figure 8:
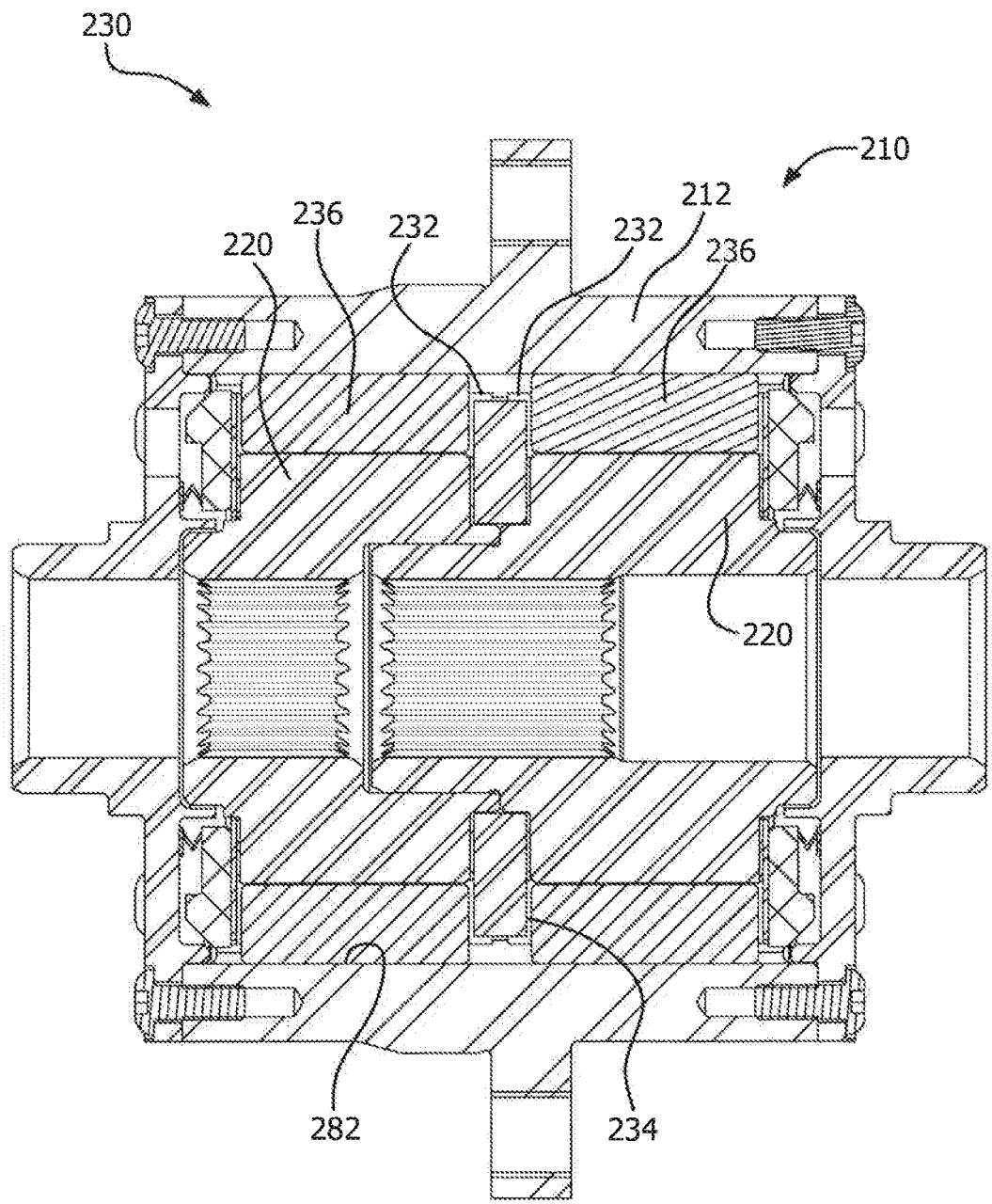
FIG. 8 is a cross section through an embodiment of a rear differential.

In contrast to the prior art systems, referring to the figures, including FIGS. 7 and 8, the present invention includes bi-directional clutches in both the rear and front differentials 20, 26. More particularly, the front differential 26 preferably includes a bi-directional overrunning clutch that controls transmission of torque between the left and right front axles 28, 30 and the front drive shaft 36. In one embodiment, the bi-directional overrunning clutch 110 includes a clutch housing 114 connected to the front drive shaft 36 so as to be rotatable by the drive shaft. The clutch housing 114 includes an inner cam surface 130. A roller assembly 132 is located inside the clutch housing and adjacent to the cam surface 130. The roller assembly 132 includes rollers or rollers 134 arranged in two sets within slots formed in a roll cage 136. The roll cage 136 rotatably supports the rollers 134. One or more springs 140 position the rollers 134 within the slots.

The axially inner ends of the left and right front axles 28, 30 include or are engaged to hubs 142 that are positioned within the interior of the roll cage 136 such that the rollers 134 are located between the outer surface of the hubs 142 and the inner cam surface 130.

The hubs 142 are substantially coaxially aligned with each other within the housing 114, and are each adapted to rotate about their common axis within the housing 114. Each hub 142 has a substantially cylindrical outer surface having a diameter that is smaller than the diameter of the inner surface of the housing so that an annular space is formed between the outer surface of the hubs 142 and the inner surface of the housing 114.

The rollers 134 are adapted to be wedgingly engaged between the hub 142 and the inner cam surface 130 of the housing 114 when one of the hubs and the housing is rotated with respect to the other. In particular, when the housing 114 is rotationally driven by the rear drive shaft 34 at a speed faster than the hubs 142 are rotating, the rollers 134 wedgingly engage between the forward cam surfaces in the housing 114 and the outer surfaces of the hubs 142, causing the hubs to rotate with the housing. In contrast, when one or both of the hubs attempt to rotate faster than the housing, the rollers wedgingly engage between the reverse earn surface and one or both of the hubs. The reverse cam surface engagement enables engine braking whereby the reduced speed of the drive shaft slows or brakes the relevant axle or axles.

The front differential may include an engagement control assembly 160 located within the housing for controlling the engagement and disengagement of the bi-directional overrunning clutch. In one embodiment, the engagement control assembly 160 may include an electromechanical device, such as a coil, solenoid or other electrically controlled mechanism 162, that engages, attracts or otherwise retains (either directly or indirectly) an armature plate 164. The armature plate is preferably engaged or connected with the roll cage 136 such that the armature plate 164 rotates with the roll cage 136. Suitable front differentials with bi-directional overrunning clutches are disclosed in U.S. Pat. Nos. 6,629,590, 6,622,837, RE38,012, and 7,410,042, and pending U.S. application Ser. No. 12/969,152 (publication no. US 2012/0152686), the disclosures of which are all incorporated herein by reference in their entireties.

The rear differential 20 preferably includes a bi-directional overrunning clutch 210 that controls transmission of torque between the left and right rear axles 22, 24 and the rear drive shaft 34. In one embodiment, the bi-directional overrunning clutch 210 in the rear differential 20 includes a clutch housing 212 connected to the rear drive shaft 34 so as to be rotatable by the drive shaft 34. The housing 212 includes an inner cam surface 282 with a plurality of forward and reverse cam surfaces.

The axially inner ends of the rear left and right axles 22, 24 are attached to or include hubs 220 that are located within the clutch housing 212. The hubs 220 are substantially coaxially aligned with each other within the housing 212, and are each adapted to rotate about their common axis within the housing 212. Each hub 220 has a substantially cylindrical outer surface having a diameter that is smaller than the diameter of the inner surface of the housing 212 so that an annular space is formed between the outer surface of the hubs 220 and the inner surface of the housing 212.

A roller assembly 230 is located within the housing 212 with a portion of the roller assembly 230 being situated in the annular space between the outer surface of the hubs 220 and the inner surface of the housing 212. The roller assembly 230 includes a roll cage 232 formed in a substantially cylindrical shape. The roll cage 232 has two sets of slots 234 spaced around the circumference of the roll cage, each slot 234 receiving a cylindrical roll or roller 236. A first set of slots 234 positions a plurality of the rollers 236 between one of the hubs 220 and the inner cam surface 282 of the housing 212, and a second set of slots 234 positions a plurality of the rollers 236 between the other hub 220 and the inner cam surface 282 of the housing 212. One or more springs may be provided to position the rollers in the slots.

The rollers 236 are adapted to be wedgingly engaged between the hub 220 and the inner cam surface 282 of the housing 212 when one of the hubs 220 and the housing 212 is rotated with respect to the other. In particular, when the housing 212 is rotationally driven by the rear drive shaft 34 at a speed faster than the hubs are rotating, the rollers wedgingly engage between the forward cam surfaces in the housing 212 and the outer surfaces of the hubs, causing the hubs 220 to rotate with the housing 212. In contrast, when one or both of the hubs 220 attempt to rotate faster than the housing 212, the rollers wedgingly engage between the reverse cam surface and one or both of the hubs 220. The reverse cam surface engagement enables engine braking whereby the reduced speed of the rear drive shaft 34 slows or brakes the rear axle or axles 22, 24. U.S. Pat. No. 6,722,484 discloses an overrunning clutch arrangement for a primary drive axle which includes provision for engine braking. U.S. Pat. No. 6,722,484 is incorporated herein by reference in its entirety.

Providing two sets of rollers within the roll cage allows overrunning of one or the other hub. For example, when the vehicle travels around a curve, the wheel on the inside of the curve has a shorter distance to travel, and thus travels at a slower speed, than the wheel on the outside of the turn. Consequently, when the housing is being rotationally driven while the vehicle is in a turn, the non-overrunning hub associated with the inside wheel will continue to be driven, with its respective rollers engaged between the outer surface of the non-overrunning hub and the forward cam surfaces of the inner surface of the housing, while the overrunning hub associated with the faster turning outside wheel will be allowed to overrun, turning faster than the housing, such that its respective rollers disengage from the inner cam surfaces and allow the overrunning hub to freely rotate as driven by the outer wheel. When the vehicle returns to a straight path and the housing is being rotationally driven, the rollers surrounding the formerly overrunning hub reengage the forward cam surfaces so that both hubs are once again driven to rotate at the same speed as the housing. Suitable rear differentials with bi-directional overrunning clutches for a primary drive axle are disclosed in U.S. Pat. No. 6,722,484 and in U.S. patent application Ser. Nos. 13/288,307 and 13/832,473; the disclosures of which are incorporated herein by reference in their entirety.

One preferred primary drive clutch is discloses in U.S. patent application Ser. No. 13/832,473 and includes a split roll cage, each roll cage including a set of the rollers. The two cages are coupled through a roll cage coupler positioned between the two roll cages. The coupler includes a hub with a plurality of teeth extending radially outward from the hub and engaging with the slots in each roll cage, but are sized so that a gap exists. This gap is designed to permit each roll cage to shift or index with respect to the other roll cage so that the rollers are positioned to engage with the cam surface, but the gap is not large enough to permit the other roll cage to index in the opposite direction.

To assist in indexing the roll cage assemblies to their corresponding hubs, a friction disk mechanism is incorporated into the assembly. Rotationally coupling together two separate roll cages with an intermittent coupler allows each roll cage to move axially with respect to its associated hub, which enables a compact and simple friction disk mechanism to index each roll cage relative to its associated hub. Each friction disk mechanism creates a frictional engagement between its associated roll cage assembly and hub so that roll cages rotate with the hubs when both hubs are rotating. In combination, the friction disk mechanisms and the roll cage coupler make up an indexing assembly.

When a wheeled vehicle is stationary such that the hubs are stationary, and rotational movement is applied to the housing via an external drive mechanism, the housing begins to rotate with respect to the hubs. The friction disk mechanisms prevent the roll cage assemblies from rotating with respect to the hubs (thus indexing the roll cage assemblies relative to the housing). Indexing places the rollers in position so that they can wedgingly engage between the forward cam surfaces and the hub. Once the rollers are wedgingly engaged, the housing, the roll cages, and the hubs all rotate together, and the rollers remain non-rotating about their own axes.

During overrunning of one hub, the friction of each friction disk mechanism continues to hold its associated roll cage assembly in position relative to the housing. The speed of the overrunning hub, however, is faster than the speed of the roll cage, thus causing the hub to drive the rollers in the roll cage assembly associated with the faster hub out of their wedging engagement so that the hub can rotate faster than the housing. At this point the rollers in the roll cage assembly associated with faster hub are free to rotate about their own axes. The other hub continues to be driven at the same rotational speed as the housing, with its corresponding rollers wedged into engagement. The roll cage coupler couples the two roller assemblies so that both remain engaged to the driven (non-overrunning) hub, thereby preventing either or both of the roller assemblies from indexing from forward engagement of the rollers into reverse engagement. The gap between the intermittent coupler and roll cages is designed to allow limited movement for proper function within the assembly system.

Each friction disk mechanism may include a friction plate or disk that is attached to, formed on, or engaged with the roll cage so as to rotate in combination with the roll cage. The friction plate can be permanently or removably attached to the roll cage, or may simply be a surface on the roll cage. In one embodiment, the friction plate is a substantially planar annular ring with radially extending tabs or teeth that are sized to extend into the slots on the roll cage when the friction plate is placed within the roll cage and adjacent to an inside end surface of the roll cage. The friction plate is configured to engage with a portion of the hub. More specifically, in one embodiment, the hub includes a contact surface, which may be integral with, formed on, or attached to the hub, preferably on an axial end surface of the hub so as to be adjacent to a portion of the friction plate. The portions of the friction plate and contact surface that contact one another preferably have a sufficient coefficient of friction to create frictional contact for transferring torque between the two as contemplated by the present invention.

A spring is incorporated and biases the roll cage, and thus the friction plate, into the contact surface of the hub. As such, the spring causes the roll cage to move axially with respect to the hub, thereby urging the friction plate into frictional engagement with the hub.

More details on suitable split cage arrangements for a rear drive bi-directional overrunning clutch can be found in U.S. patent application Ser. No. 13/832,473. Other friction drive mechanisms for a rear drive bi-directional overrunning clutch can be found in U.S. patent application Ser. No. 13/305,943, which is incorporated herein in its entirety.

Straight Line Operation:

The present invention permits the slowest turning wheel to dictate ground speed. When driving in a straight line, if all the wheels have an equal diameter, each wheel should be rotating at the same speed. Since both rear wheels 12, 14 are rotating at the same speed the rear differential 20 will be engaged such that the left and rear axles 22 and 24 are positively engaged with the rear drive shaft 34 through the rear differential 20. As such, torque will be transmitted equally to both axles and from there to the wheels 12, 14. The front wheels 16, 18 will also be rotating at the same speed as the rear wheels 12,14, which will be dictated by the ground speed. If running 1:1 gearing in the drive shafts 34, 36, the bi-directional clutch in the front differential 26 is set such that the front axles 28, 30 are engaged (positive lock up). As such, torque will be transmitted to the front axles 28, 30 from the front drive shaft 36 through the front differential 26. This will cause all four wheels to be driving torque and also rotating at the same speed which is the ground speed of the vehicle.

In this condition, the only way for one wheel to slip is for all four wheels to slip due to the drive line having a 1:1 gearing and bi-directional overrunning clutches in both front differential 26 and rear differential 20. Hence, it is true four wheel drive. A drive system with pure 1:1 gearing (i.e. the gear ratios in the drive train as set so that all the wheels are driven at the same speed going forward) is highly efficient and provides full traction without any slippage of the wheels relative to ground.

However, a drive system that has all four wheels being driven while the vehicle is going straight may not provide the most fuel efficient configuration. As such, in one embodiment, in order to increase fuel efficiency, as well as to accommodate slight tire size differences due to manufacturing processes and tire pressure changes, the system incorporates a small degree of under drive so that, during straight line driving, only the rear wheels are driving the vehicle. In this embodiment, the drive shafts 34, 36 do not have a true 1:1 ratio, but incorporate a small amount of under drive into the front differential 26. The small amount of under drive designed into the front differential is preferably configured to generate about 1% to about 5% less speed in the front wheels than in the rear wheels. This small amount of under drive will allow the front wheels 16, 18 to overrun (more specifically, the front hubs in the front bi-directional overrunning clutch to overrun) during straight driving. The small amount of under drive will result in there being a slight amount of rear wheel slippage before the front wheels engage and drive torque through all four wheels. That slight amount of slip will be virtually undetectable by the driver. In one embodiment, the under drive in the front wheels (i.e., the amount that the rear wheels will slip before the rollers in the front bi-directional overrunning clutch wedge) is about 5%, or more preferably about 2 or 3%. For simplicity, as used herein "near 1:1" refers to a drive line ratio that includes an under drive in the front wheels of about 5% or less. It will be appreciated that the under drive can be incorporated into the transmission, the drive shaft 26 or the gearing in the front differential such that the speed of the front hubs at which point the rollers in the front bi-directional overrunning wedge is between 0% and 5% slower than the speed of the rear hubs.

The following charts illustrate the various configurations and wheel speeds of the drive system 10 during straight driving.

TABLE 1

During Constant Speed or Acceleration
Straight driving, traction is available to all four wheels

| Component | Action | Speed |
|---|---|---|
| Rear drive shaft 34 | Engaged to front drive shaft through transmission | 10 rpm |
| Rear left wheel 12 | Bi-directional clutch in rear differential is engaged on drive ramp | 10 rpm |
| Rear right wheel 14 | Bi-directional clutch in rear differential is engaged on drive ramp | 10 rpm |
| Front drive shaft 36 | Engaged to rear drive shaft through transmission | 10 rpm |
| Front left wheel 16 | Bi-directional clutch in front differential is engaged on drive ramp (or slightly overrunning) | 10 rpm |
| Front right wheel 18 | Bi-directional clutch in front differential is engaged on drive ramp (or slightly overrunning) | 10 rpm |

TABLE 2

During Deceleration
Straight driving, traction is available to all four wheels

| Component | Action | Speed |
|---|---|---|
| Rear drive shaft 34 | Engaged to front drive shaft through transmission | 10 rpm |
| Rear left wheel 12 | Bi-directional clutch in rear differential is engaged on backdrive (engine braking) ramp | 10 rpm |
| Rear right wheel 14 | Bi-directional clutch in rear differential is engaged on backdrive (engine braking) ramp | 10 rpm |
| Front drive shaft 36 | Engaged to rear drive shaft through transmission | 10 rpm |
| Front left wheel 16 | Bi-directional clutch in front differential is overrunning on drive ramp | 10 rpm |
| Front right wheel 18 | Bi-directional clutch in front differential is overrunning on drive ramp | 10 rpm |

Figure 3:
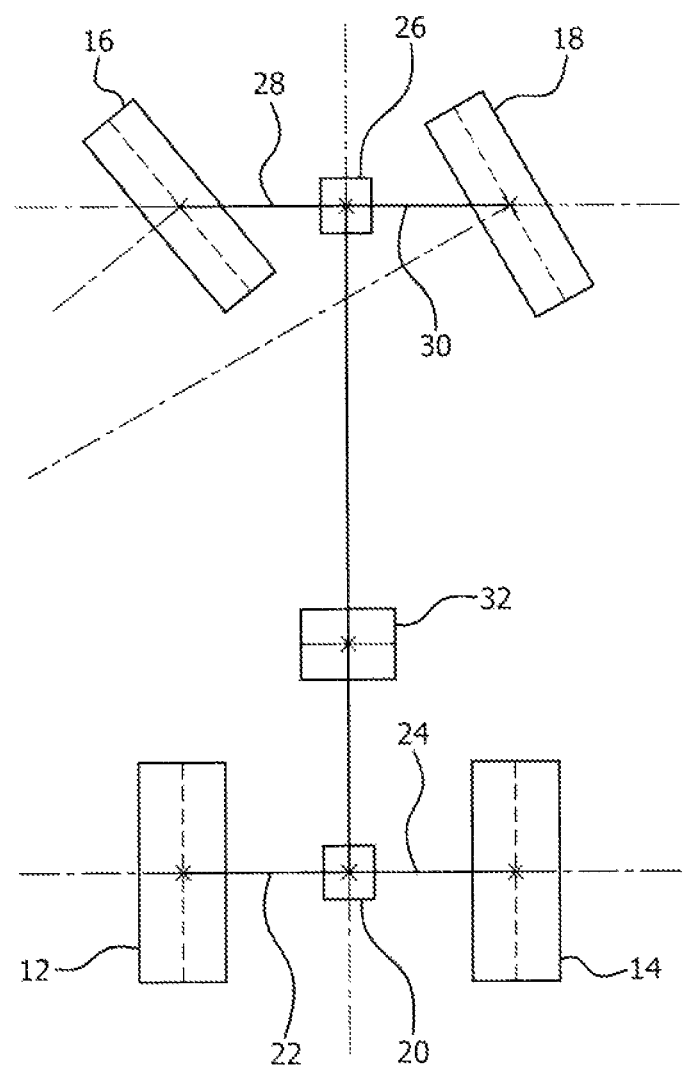
FIG. 3 is a schematic representation of the four wheel drive system of FIG. 2 while in a turn.
Figure 4:
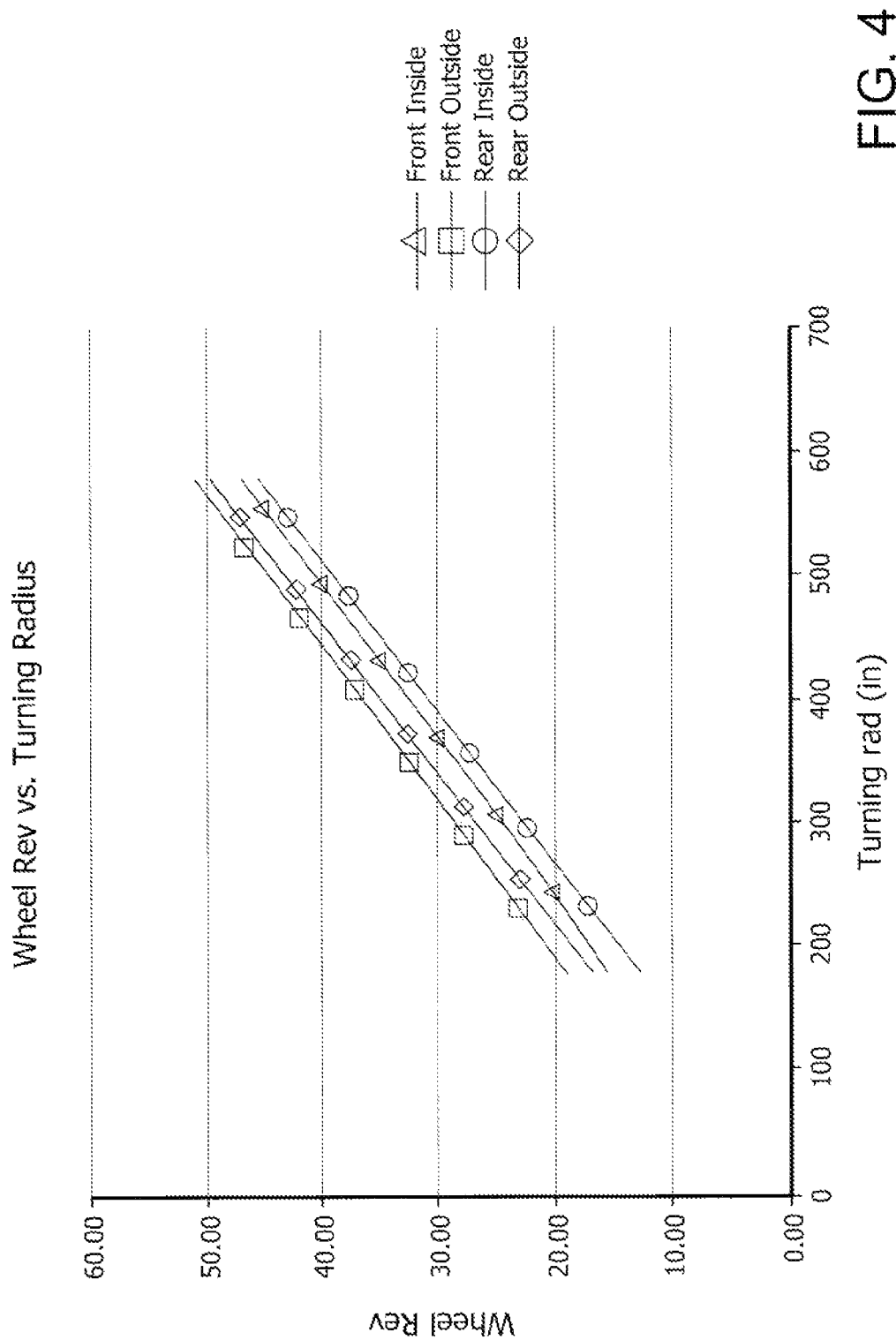
FIG. 4 is graph depicting the wheel revolutions versus turning radius for a four wheel drive system.
Figure 5:
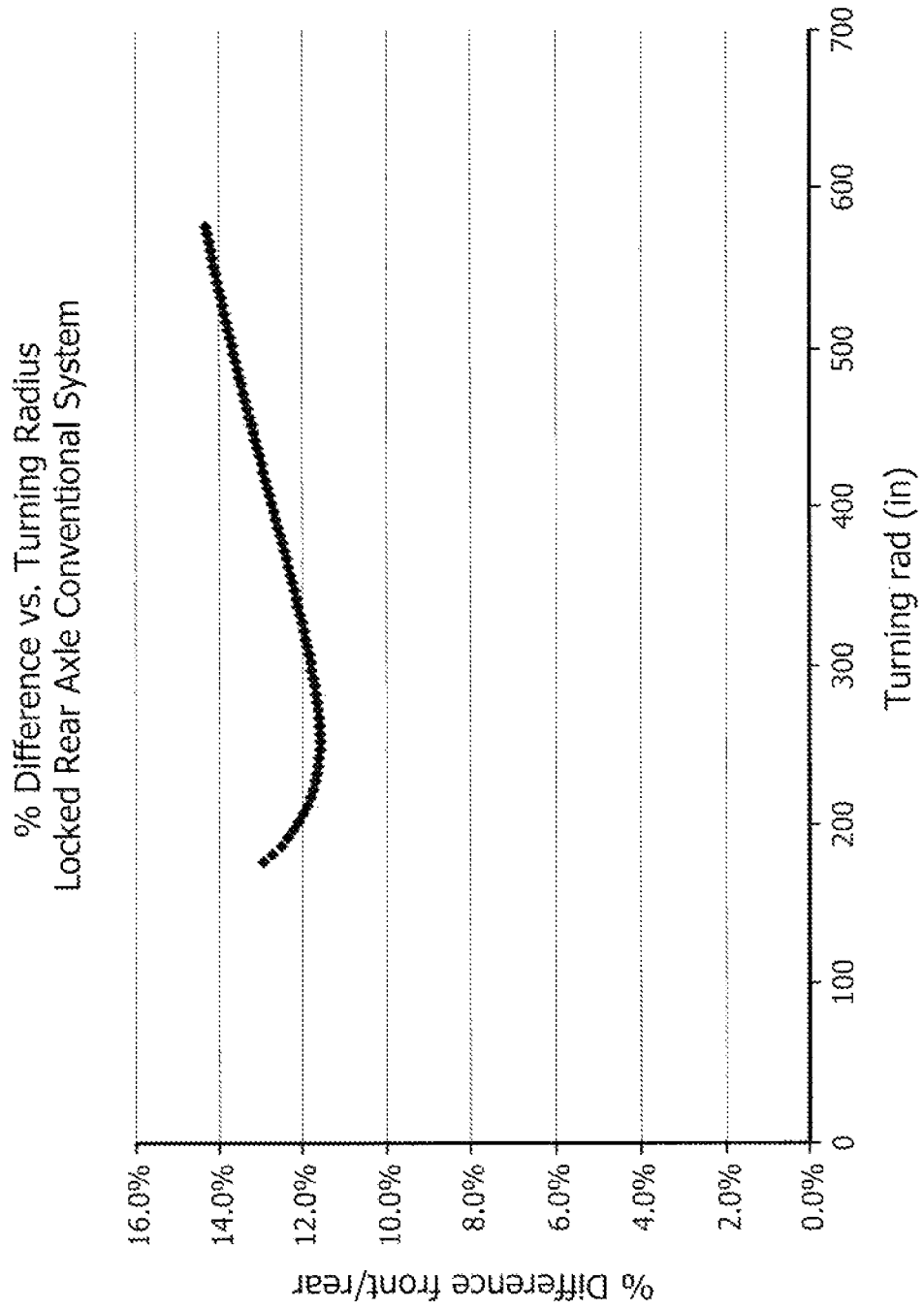
FIG. 5 is a graph depicting the percentage difference between the front inside and rear outside wheel speed versus the turning radius of a locked rear axle (as measured from the outside rear wheel) for a conventional four wheel drive system.

Turning Operation:

Referring to FIG. 3, during a turn, all four wheels are trying to go at different speeds as seen in FIG. 4. In a non-slip condition the present invention permits all four wheels 12, 14, 16, 18 to travel at their correct speeds, relative to ground. The ground speed is dictated by the slowest moving wheel, which in a left turn as depicted in FIG. 3 would be the rear inside wheel 12. This is shown in FIG. 4. As such, the rear differential 20 has positive engagement with the left rear axle 22. Since the rear outside wheel 14 is turning faster than the rear inside wheel 12, the bi-directional overrunning clutch in the rear differential 20 causes the rear outside axle 24 to overrun, thus disengaging the right outside axle 24 from the rear inside axle 22 and the rear drive shaft 34. Consequently, no torque is driven to the rear outside wheel 14 and it is free to rotate at the speed dictated by the turn.

Similarly, since the vehicle's ground speed is dictated by the rear inside wheel 12 in the illustrated embodiment, the bi-directional overrunning clutch in the front differential 26 allows the faster turning front wheels 16, 18 to overrun. As such, no torque is transmitted by the front drive shaft 36 to the front axles 28, 30. Therefore the front wheels 16, 18 are permitted to rotate at the speed dictated by the turn, since the wheels are dictated by ground speed there is no noticeable torque steer.

Figure 6:
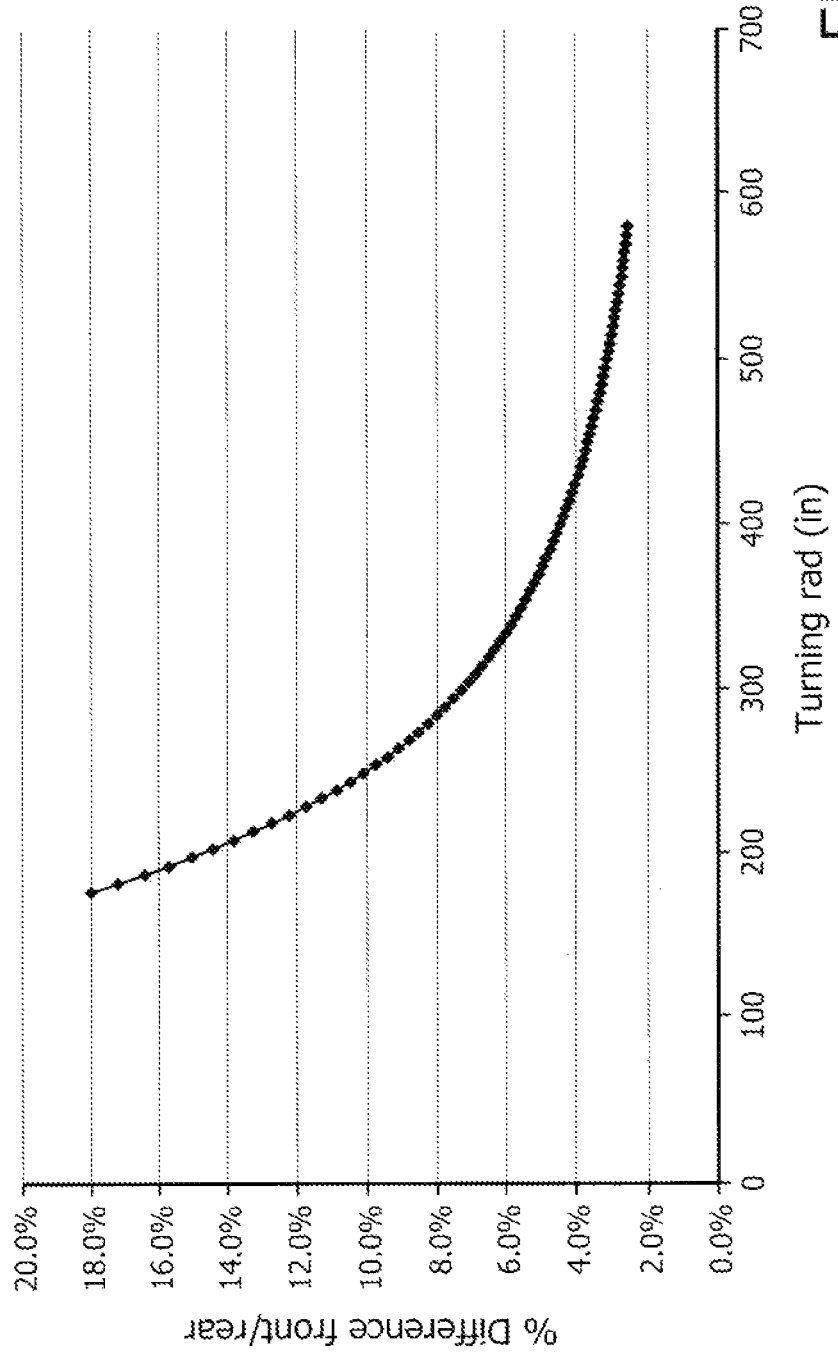
FIG. 6 is a graph depicting the percentage difference between the front inside and rear inside wheel speed versus the turning radius of a rear differential with a bi-directional overrunning primary drive clutch and 1:1 four wheel drive system, according to the present invention.

In the event that the rear inside wheel 12 loses traction and begins to slip above a certain percentage dictated by vehicle geometry and turning radius, see FIG. 6, the next slowest wheel will engage. That is the vehicle will either slow down or the front drive shaft will speed up just enough for the next slowest wheel, which in the illustrated embodiment is the front inside wheel 16 as indicated by FIG. 4, to engage, i.e. cease to overrun. Specifically, as the speed of the front inside axle 28 slows slightly, the bi-directional overrunning clutch in the front differential 26 engages the front drive shaft 36 to the front inside axle 28 thus transmitting torque from the transmission 32 to the front inside axle 28 and the front inside wheel 16. Alternately, as the speed of the front drive shaft 36 speeds up, the bi-directional overrunning clutch in the front differential 26 engages the front drive shaft 36 to the front inside axle 28 thus transmitting torque from the transmission 32 to the front inside wheel 16. At this point, the rear drive shaft 34 is still engaged with the rear inside axle 22 and the rear inside wheel 12 and transmitting torque, but because the rear inside wheel 12 is slipping, that wheel is not dictating the speed of the vehicle.

If the front inside wheel 16 also loses traction and begins to slip, i.e., the front inside and rear inside wheels 12, 16 are slipping, the next slowest wheel, which as indicated in FIG. 4 is the rear outside wheel 14, will be engaged by the overrunning clutch in the rear differential 20 so that torque is now transmitting from the rear drive shaft 34 to the rear outside axle 24 and the rear outside wheel 14. At this stage, torque is being driven to both rear wheels 12, 14 and the front inside wheel 16, although the front inside wheel 16 and the rear inside wheel 12 are slipping and, thus, are not dictating the ground speed of the vehicle.

At the point where the front inside wheel 16, and both rear wheels 12, 14 begin to slip, based on vehicle geometry, the front outside wheel 18 will engage and the front drive shaft 36 will begin to transmit torque to the front outside wheel 18. At this point all four wheels will have positive engagement and be receiving torque and, as such, the system is a true four wheel drive system. As the vehicle begins to gain traction or the drive line slows down, each of the faster running wheels automatically unlock and begin to overrun. The slip percentage is based on the turning radius of each wheel to each other, and the turning radii are determined by the vehicle geometry (primarily track width and wheel base), as well as input from the steering wheel or handle bars. Each turning radii is determined by drawing out each wheel about the turning center and then using geometry to determine the relationship to each other (see FIG. 3).

The following charts illustrate the various configurations and wheel speeds of the drive system 10 during turning while at constant speed or accelerating.

TABLE 3

During Constant Speed or Acceleration
Traveling During a Turn - Traction is available to all four wheels

| Component | Action | Speed |
|---|---|---|
| Rear drive shaft 34 | Engaged to front drive shaft through transmission | 10 rpm |
| Rear left wheel 12 | Bi-directional clutch in rear differential is engaged on drive ramp - Primary Driving Wheel | 10 rpm |
| Rear right wheel 14 | Bi-directional clutch in rear differential is overrunning on drive ramp | 20 rpm |
| Front drive shaft 36 | Engaged to rear drive shaft through transmission | 10 rpm |
| Front left wheel 16 | Bi-directional clutch in front differential is overrunning on drive ramp | 15 rpm |
| Front right wheel 18 | Bi-directional clutch in front differential is overrunning on drive ramp | 25 rpm |

TABLE 4

During Constant Speed or Acceleration
Traveling During a Turn - Traction is lost on the Primary Driving Wheel

| Component | Action | Speed |
|---|---|---|
| Rear drive shaft 34 | Engaged to front drive shaft through transmission | 10 rpm |
| Rear left wheel 12 | Bi-directional clutch in rear differential is engaged on drive ramp - Primary Driving Wheel is slipping | — |
| Rear right wheel 14 | Bi-directional clutch in rear differential is overrunning on drive ramp | 15 rpm |
| Front drive shaft 36 | Engaged to rear drive shaft through transmission | 10 rpm |
| Front left wheel 16 | Bi-directional clutch in front differential is engaged on drive ramp - Secondary Driving Wheel now driving vehicle | 10 rpm |
| Front right wheel 18 | Bi-directional clutch in front differential is overrunning on drive ramp | 20 rpm |

TABLE 5

During Constant Speed or Acceleration
Traveling During a Turn - Traction is lost on the Primary and Secondary
Driving Wheels

| Component | Action | Speed |
|---|---|---|
| Rear drive shaft 34 | Engaged to front drive shaft through transmission | 10 rpm |
| Rear left wheel 12 | Bi-directional clutch in rear differential is engaged on drive ramp - Primary Driving Wheel is slipping | — |
| Rear right wheel 14 | Bi-directional clutch in rear differential is engaged on drive ramp - Tertiary Drive Wheel now driving vehicle | 10 rpm |
| Front drive shaft 36 | Engaged to rear drive shaft through transmission | 10 rpm |
| Front left wheel 16 | Bi-directional clutch in front differential is engaged on drive ramp - Secondary Driving Wheel is slipping | — |
| Front right wheel 18 | Bi-directional clutch in front differential is overrunning on drive ramp | 15 rpm |

TABLE 6

During Constant Speed or Acceleration
Traveling During a Turn - Traction is lost on the Primary, Secondary
and Tertiary Driving Wheels

| Component | Action | Speed |
|---|---|---|
| Rear drive shaft 34 | Engaged to front drive shaft through transmission | 10 rpm |
| Rear left wheel 12 | Bi-directional clutch in rear differential is engaged on drive ramp - Primary Driving Wheel is slipping | — |
| Rear right wheel 14 | Bi-directional clutch in rear differential is engaged on drive ramp - Tertiary Drive Wheel is slipping | — |
| Front drive shaft 36 | Engaged to rear drive shaft through transmission | 10 rpm |
| Front left wheel 16 | Bi-directional clutch in front differential is engaged on drive ramp - Secondary Driving Wheel is slipping | — |
| Front right wheel 18 | Bi-directional clutch in front differential is engaged on drive ramp - Quaternary Driving Wheel | 10 rpm |

It should be readily apparent that the charts above assume substantially the same diameter wheels between the front and back. Those skilled in the art would be readily capable of adjusting the ratios for systems with different diameter wheels.

Engine Braking Operation/Deceleration:

The present system also works with a drive system that incorporates engine braking. The drive system 10 will engine brake in a manner very similar to a vehicle with a solid rear axle that includes a front differential 26 such as described in U.S. Pat. Nos. 6,629,590, 6,622,837, RE38,012, and 7,410,042, and U.S. application Ser. No. 12/793,488, filed Jun. 3, 2010. During driving in a straight line, the rear differential 20 will shift into the reverse profile (engine braking condition) and both rear wheels 12, 14 will begin to drive negative torque, that is the wheels drive torque to the transmission 32 through the rear drive shaft 34, thus causing the vehicle to slow down. The overrunning clutches in the front differential 26 will overrun in this condition or will begin to engine brake if the front differential 26 includes a bi-directional overrunning clutch such as described in U.S. Pat. No. 7,410,042. This will permit all four wheels to contribute to the engine braking.

During deceleration in a turn, under a no slip condition of the wheels, the rear differential 20 will allow the rear inside wheel 12 to under run and rotate at the correct speed. Under this condition only the rear outside wheel 14 will be engine braking. When coupled with a front differential 26 such as described above, depending on vehicle geometry, the front inside wheel 16 will engage during the turn. With this condition the rear outside wheel 14 and front inside wheel 16 are being rotated at the same speed. The rollers in the bi-directional overrunning clutch in the front differential 26 would be engaged against the drive cam surface, while the rollers in the bi-directional overrunning clutch in the rear differential 20 would be engaged against the engine braking cam surface.

The following chart illustrate the various configurations and wheel speeds of the drive system 10 during turning while decelerating/engine braking.

TABLE 7

During Deceleration/Engine Braking
Traveling During a Turn - Traction is available to all four wheels

| Component | Action | Speed |
|---|---|---|
| Rear drive shaft 34 | Engaged to front drive shaft through transmission | 10 rpm |
| Rear left wheel 12 | Bi-directional clutch in rear differential is under running on backdrive ramp | 10 rpm |
| Rear right wheel 14 | Bi-directional clutch in rear differential is engaged on backdrive ramp - One of two Primary Driving Wheels | 20 rpm |
| Front drive shaft 36 | Engaged to rear drive shaft through transmission | 10 rpm |
| Front left wheel 16 | Bi-directional clutch in front differential is engaged on drive ramp - One of two Primary Driving Wheels | 20 rpm |
| Front right wheel 18 | Bi-directional clutch in front differential is overrunning on drive ramp | 25 rpm |

One of the advantages of the drive system 10 according to the present invention is the ability to have true four wheel drive, while at the same time preventing some rear wheel scrubbing (causing turf damage). Also since the system adjusts so that none of the rear tires is being driven at an incorrect speed, the drive system 10 does not increase steering effort under normal driving conditions, as happens in conventional systems.

Another advantage of the present system is that by going to a 1:1 or close ratio system, the efficiency of the vehicle increases. There is significantly less wheel slip before the front wheels engage and because of the reduction in wheel slip, turf damage and tire wear will decrease. There is also no sacrificing of steering effort or added torque steer when torque is not needed to the front wheels. This advantage can be seen in many situations the vehicle may encounter:

Rock climbing—There is relatively little rear wheel slip, so the vehicle is more controlled climbing through rocks or large objects.

Hill Climbing—With the conventional bi-directional overrunning systems there is a large amount of rear wheel slip (20% front to rear) during a hill climb in order for the front wheels to engage to assist in pulling up the hill. When the conventional bi-directional overrunning clutch system drives torque through all four wheels, the front and rear wheels are spinning at different speeds causing turf damage. The drive system according to the present invention permits the vehicle to climb hills more easily with less turf damage because all four wheels can drive torque and rotate at or close to the same speed.

Side Hill Crossings—In conventional drive systems, the rear wheels must slip 20% in order for the front wheels to drive torque. When crossing side hills on low traction situations the rear of the vehicle will side step because of the loss of traction with the rear tires. Once the rear of the vehicle slides out, control of the vehicle is decreased. With the present invention, the side crossing on low traction situations is greatly improved since the front to rear gear ratio is close, all four wheels rotate at the same speed while also driving torque to pull you across the hill. This keeps the vehicle more stable and the driver has more control over the vehicle.

A further advantage of the present invention is evident during cornering. In the drive system 20 of the present invention, all but the inside rear wheel 12 are unlocked and allowed to overrun during a turn. As mentioned above, in conventional drive systems, both rear wheels are locked together forcing one of the rear tires to scrub or drag. This scrubbing can lead to turf damage, tire wear, and increases the turning radius of the vehicle. The drive system 10 of the present invention has a tighter turning radius in four wheel drive than a solid rear axle vehicle or even a standard open rear differential vehicle.

Another advantage of the present invention is that it reduces wedging and the effects of wedging. With the drive line ratio being 1:1 or very close, the likelihood that the drive line will produce wedging is decreased. Because the engagement speed difference between the front and rear wheels is significantly less than 20%, the chances that the drive line will bind or that torque will be driven through the front wheels in a wedged condition is significantly decreased. Since the drive line bind is decreased and the wedge torque is significantly reduced, torque steering from the wedged condition is also greatly reduced or not noticeable. With the reduction or elimination of wedging, the systems or strategies that have been incorporated in conventional systems to reduce wedging (such as cut-off switches) can be eliminated from the vehicle, thereby reducing the cost and complexity of the drive system, and reducing loading on the drive system components.

Another advantage provided by the drive system 10 is that the ability to come out of a wedged condition under normal driving. If the front drive does become wedged, the drive line bind is minimized because of the 1:1 ratio, and with the minimized drive line bind the torque in the drive line is also minimized during a wedge condition. Since the vehicle is not driving heavy torque loads, the bi-directional overrunning clutch is able to disengage out of the wedged condition more easily and the clutch is able to index to its proper location very quickly.

A further advantage of the present invention is the reduction in turf damage while in four wheel drive. When there is no slip of the tires in a corner only one wheel is being driven and all the other wheels are allowed to travel at the correct speeds and not drag or scrub any of the tires. Once there is slip on the wheels, because of the 1:1 drive line, the slip is minimized before the next wheel will engage. This reduction of slip when more traction is needed will help to minimize turf damage while still driving multiple wheels when needed.

The present invention can be used with a variety of four wheel drive systems. It is also not limited to vehicles with locked rear axles.

The present invention may be embodied in other specific forms without departing from the spirit or essential attributes thereof and, accordingly, reference should be made to the appended claims, rather than to the foregoing specification, as indicating the scope of the invention.

The invention claimed is:

1. A drive train for a four wheel drive vehicle comprising:
   a front drive shaft connected to a transmission;
   two front axles, each axle connected to a corresponding front wheel;
   a front differential engaged with the front drive shaft and the front axles through a front differential gear set, the front differential including a front bi-directional overrunning clutch that controls transmission of torque transfer between the front drive shaft and the front axles, the front bi-directional overrunning clutch including:
      a front clutch housing connected to the front drive shaft so as to be rotatable by the front drive shaft, the front clutch housing including an inner cam surface,
      a front roller assembly is located inside the front clutch housing and adjacent to the cam surface, the front roller assembly including a roll cage with a plurality of rollers arranged in two sets within slots formed in the roll cage, the rollers being rotatable inside the slots, and a plurality of springs arranged so as to position the rollers within the slots, wherein the roll cage is rotatable within the front clutch housing,
      two front hubs, each front hub located in the front clutch housing and positioned radially inward from a set of the rollers located between an outer surface of the front hub and the inner cam surface, each front hub being engaged with an axial end of one of the front axles so as to rotate in combination therewith, the front hubs being independently rotatable within the roll cage and the front clutch housing, and
      a front engagement control assembly located within the housing for controlling engagement and disengagement of the front bi-directional overrunning clutch, the front engagement control assembly including an electromechanical device that is controllable for impeding rotation of the roll cage relative to the front clutch housing for indexing the roll cage relative to the front clutch housing;
   wherein the front bi-directional overrunning clutch transmits torque from the front drive shaft to the front axles when the front clutch housing is rotating faster than the front axles and the engagement control assembly is activated so as to index the roll cage relative to the clutch housing, and wherein when the vehicle is traveling straight the front differential is configured to begin to transmit torque from the front drive shaft to the front axles at a first speed;
   two rear axles, each axle connected to a corresponding rear wheel; and
   a rear differential engaged with the rear axles and the transmission through a rear differential gear set, the rear differential including a rear bi-directional overrunning clutch that controls torque transfer between the transmission and the rear axles, the rear bi-directional overrunning clutch including:
      a rear clutch housing rotatable by the transmission, the rear clutch housing including an inner cam surface;
      a rear roller assembly located inside the rear clutch housing and adjacent to the cam surface, the rear roller assembly including a roll cage with a plurality of rollers arranged in two sets within slots formed in the roll cage, the rollers being rotatable inside the slots, wherein the roll cage is rotatable within the rear clutch housing, and two rear hubs, each rear hub located in the rear clutch housing and positioned radially inward from a set of the rollers located between an outer surface of the rear hub and the inner cam surface, each rear hub being engaged with an axial end of one of the rear axles so as to rotate in combination therewith, the rear hubs being independently rotatable within the roll cage and the rear clutch housing, wherein the rollers in each set of the rear roller assembly are adapted to wedgingly engage the corresponding rear hub to the rear clutch housing when the vehicle is traveling straight and one of either the corresponding rear hub or rear clutch housing is rotating faster than the other so as to transmit torque therebetween, and wherein when the vehicle is traveling straight and the rear differential is transmitting torque to the rear axles, the rear differential is configured to rotate the rear axles at a second speed, and wherein the difference between the first speed and the second speed is five percent or less.

2. The drive train of claim 1, wherein the front bi-directional overrunning clutch includes an armature plate that is engaged or connected with the front roll cage such that the armature plate rotates with the roll cage; and wherein the front engagement control assembly impedes rotation of the roll cage relative to the front clutch housing by engaging the armature plate so as to index the roll cage relative to the clutch housing.

3. The drive train of claim 1, wherein the hubs are substantially coaxially aligned with each other within the housing, and are each adapted to rotate about their common axis within the housing.

4. The drive train of claim 1 wherein the rear differential is part of a transaxle which is engaged with the transmission.

5. The drive train of claim 1 wherein the difference between the first speed and the second speed is less than about three percent.

6. The drive train of claim 1 wherein there is substantially no difference between the first speed and the second speed.

7. The drive train of claim 1 wherein the front differential is part of a transaxle which is engaged with the transmission.

8. A drive train for a four wheel drive vehicle comprising:
a front drive shaft connected to a transmission;
two front axles, each axle connected to a corresponding front wheel;
a front differential engaged with the front drive shaft and the front axles through a front differential gear set, the front differential including a front bi-directional overrunning clutch that controls transmission of torque transfer between the front drive shaft and the front axles, the front bi-directional overrunning clutch including:
a front clutch housing connected to the front drive shaft so as to be rotatable by the front drive shaft, the front clutch housing including an inner cam surface,
a front roller assembly is located inside the front clutch housing and adjacent to the cam surface, the front roller assembly including a roll cage with a plurality of rollers arranged in two sets within slots formed in the roll cage, the rollers being rotatable inside the slots, and a plurality of springs arranged so as to position the rollers within the slots, wherein the roll cage is rotatable within the front clutch housing, two front hubs, each front hub located in the front clutch housing and positioned radially inward from a set of the rollers located between an outer surface of the front hub and the inner cam surface, each front hub being engaged with an axial end of one of the front axles so as to rotate in combination therewith, the front hubs being independently rotatable within the roll cage and the front clutch housing, and a front engagement control assembly located within the housing for controlling engagement and disengagement of the front bi-directional overrunning clutch, the front engagement control assembly including an electromechanical device that is controllable for impeding rotation of the roll cage relative to the front clutch housing for indexing the roll cage relative to the front clutch housing;

wherein the front bi-directional overrunning clutch transmits torque from the front drive shaft to the front axles when the front clutch housing is rotating faster than the front axles and the engagement control assembly is activated so as to index the roll cage relative to the clutch housing;

two rear axles, each axle connected to a corresponding rear wheel; and a rear differential engaged with the rear axles and the transmission through a rear differential gear set, the rear differential including a rear bi-directional overrunning clutch that controls torque transfer between the transmission and the rear axles, the rear bi-directional overrunning clutch including:
a rear clutch housing rotatable by the transmission, the rear clutch housing including an inner cam surface,
a rear roller assembly located inside the rear clutch housing and adjacent to the cam surface, the rear roller assembly including at least one roll cage with a plurality of rollers arranged in two sets within slots formed in the roll cage, the rollers being rotatable inside the slots, wherein the roll cage is rotatable within the rear clutch housing, and
two rear hubs, each rear hub located in the rear clutch housing and positioned radially inward from a set of the rollers located between an outer surface of the rear hub and the inner cam surface, each rear hub being engaged with an axial end of one of the rear axles so as to rotate in combination therewith, the rear hubs being independently rotatable within the roll cage and the rear clutch housing,
wherein the rollers in each set of the rear roller assembly are adapted to wedgingly engage the corresponding rear hub to the rear clutch housing when the vehicle is traveling straight and one of either the corresponding rear hub or rear clutch housing is rotating faster than the other so as to transmit torque therebetween;

wherein the front bi-directional overrunning clutch is configured such that when the vehicle is traveling straight and the front engagement control assembly is activated the rollers in the front bi-directional overrunning clutch wedge for transmitting torque at a speed that is five percent or less than the speed at which the rear bi-directional overrunning clutch transmits torque to the rear axles.

9. The drive train of claim 8, wherein the front bi-directional overrunning clutch includes an armature plate that is engaged or connected with the front roll cage such that the armature plate rotates with the roll cage; and wherein the front engagement control assembly impedes rotation of the roll cage relative to the front clutch housing by engaging the armature plate so as to index the roll cage relative to the clutch housing.

10. The drive train of claim 8, wherein the hubs are substantially coaxially aligned with each other within the housing, and are each adapted to rotate about their common axis within the housing.

11. The drive train of claim 8 wherein the rear differential is part of a transaxle which is engaged with the transmission.

12. The drive train of claim 8 wherein the speed at which the rollers in the front bi-directional overrunning clutch wedge is less than about three percent of the speed at which the rear bi-directional overrunning clutch transmits torque to the rear axles.

13. The drive train of claim 8 wherein there is substantially no difference between the speed at which the rollers in the front bi-directional overrunning clutch wedge as compared to the speed at which the rear bi-directional overrunning clutch transmits torque to the rear axles.

14. The drive train of claim 8 wherein the front differential is part of a transaxle which is engaged with the transmission.

15. The drive train of claim 9 wherein there are two roll cages in the rear bi-directional overrunning clutch, each roll cage including a set of the rollers and one of the hubs.

* * * * *